United States Patent
Gigie et al.

(10) Patent No.: US 11,960,654 B2
(45) Date of Patent: Apr. 16, 2024

(54) ACOUSTIC SYSTEM AND METHOD BASED GESTURE DETECTION USING SPIKING NEURAL NETWORKS

(71) Applicant: Tata Consultancy Services Limited, Mumbai (IN)

(72) Inventors: Andrew Gigie, Bangalore (IN); Arun George, Bangalore (IN); Achanna Anil Kumar, Bangalore (IN); Sounak Dey, Kolkata (IN); Arpan Pal, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 18/065,713

(22) Filed: Dec. 14, 2022

(65) Prior Publication Data
US 2023/0325001 A1 Oct. 12, 2023

(30) Foreign Application Priority Data
Apr. 9, 2022 (IN) .............................. 202221021309

(51) Int. Cl.
*G06F 3/01* (2006.01)
*G06N 3/0464* (2023.01)
*G06N 3/049* (2023.01)

(52) U.S. Cl.
CPC ............ *G06F 3/017* (2013.01); *G06N 3/0464* (2023.01); *G06N 3/049* (2013.01)

(58) Field of Classification Search
CPC ...... G06F 3/017; G06N 3/0464; G06N 3/049; G06N 3/0495; G06N 3/084; G01S 7/53;
(Continued)

(56) References Cited

U.S. PATENT DOCUMENTS

2012/0001875 A1* 1/2012 Li ........................... G06F 3/017
 345/177
2023/0161439 A1* 5/2023 Pirogov .............. G06F 3/04166
 345/178

FOREIGN PATENT DOCUMENTS

CN 109361376 A 2/2019
CN 111753774 A * 10/2020 ............. G06N 3/045

OTHER PUBLICATIONS

Zhengjie Wang et al., "Hand Gesture Recognition Based on Active Ultrasonic Sensing of Smartphone: A Survey," IEEE Access, Aug. 2019, IEEE, https://ieeexplore.ieee.org/ielx7/6287639/8600701/08792172.pdf.

(Continued)

*Primary Examiner* — Towfiq Elahi
(74) *Attorney, Agent, or Firm* — Finnegan, Henderson, Farabow, Garrett & Dunner, LLP

(57) ABSTRACT

Conventional gesture detection approaches demand large memory and computation power to run efficiently, thus limiting their use in power and memory constrained edge devices. Present application/disclosure provides a Spiking Neural Network based system which is a robust low power edge compatible ultrasound-based gesture detection system. The system uses a plurality of speakers and microphones that mimics a Multi Input Multi Output (MIMO) setup thus providing requisite diversity to effectively address fading. The system also makes use of distinctive Channel Impulse Response (CIR) estimated by imposing sparsity prior for robust gesture detection. A multi-layer Convolutional Neural Network (CNN) has been trained on these distinctive CIR images and the trained CNN model is converted into an equivalent Spiking Neural Network (SNN) via an ANN (Continued)

(Artificial Neural Network)-to-SNN conversion mechanism. The SNN is further configured to detect/classify gestures performed by user(s).

18 Claims, 9 Drawing Sheets

(58) Field of Classification Search
CPC .......... G01S 7/539; G01S 7/534; G01S 7/536; G01S 7/54; G01S 15/876; G01S 15/88; G06V 10/82; G06V 40/28
See application file for complete search history.

(56) References Cited

OTHER PUBLICATIONS

Ahmed Ibrahim et al., "Pervasive Hand Gesture Recognition for Smartphones using Non-audible Sound and Deep Learning," Machine Learning—Audio and Speech Processing, Aug. 2021, Arxiv https://arxiv.org/pdf/2108.02148.pdf.

Ing Jyh Tsang et al, "Radar-Based Hand Gesture Recognition Using Spiking Neural Networks Title of the item: Electronics," Jun. 2021, MDPI, https://www.mdpi.com/2079-9292/10/12/1405.

Jibin Wu et al., "A Spiking Neural Network Framework for Robust Sound Classification," Neurosceince, Nov. 2018, Frontiers, https://www.frontiersin.org/articles/10.3389/fnins.2018.00836/full.

\* cited by examiner

| | Anti CW Rotation | CW Rotation | Click | Double click | Push Pull | Pull Push | Slide left | Slide right |
|---|---|---|---|---|---|---|---|---|
| Anti CW Rotation | 94 | 3 | 1 | 0 | 1 | 1 | 0 | 0 |
| CW Rotation | 3 | 87 | 1 | 0 | 5 | 2 | 0 | 2 |
| Click | 2 | 0 | 80 | 14 | 0 | 2 | 0 | 2 |
| Double click | 0 | 0 | 0 | 100 | 0 | 0 | 0 | 0 |
| Push Pull | 3 | 2 | 0 | 0 | 91 | 2 | 1 | 1 |
| Pull Push | 0 | 0 | 0 | 0 | 0 | 100 | 0 | 0 |
| Slide left | 0 | 0 | 0 | 0 | 0 | 0 | 100 | 0 |
| Slide right | 0 | 0 | 0 | 0 | 0 | 0 | 0 | 100 |

FIG. 9

ACOUSTIC SYSTEM AND METHOD BASED GESTURE DETECTION USING SPIKING NEURAL NETWORKS

PRIORITY CLAIM

This U.S. patent application claims priority under 35 U.S.C. § 119 to: Indian Patent Application No. 202221021309, filed on Apr. 9, 2022. The entire contents of the aforementioned application are incorporated herein by reference.

TECHNICAL FIELD

The disclosure herein generally relates to the field of gesture recognition, and, more particularly, to acoustic system and method based gesture detection using Spiking Neural Networks (SNN).

BACKGROUND

In recent trends, human computer interaction (HCI) is not just limited to specific hardware such as mouse and keyboard but has broadened to include human sensory modes such as gestures, speech, and facial patterns. Gesture based HCI is one of the most important and attractive technique that has been widely adopted and diverse sensing modalities such as camera, wearable devices, Radio Frequency, and ultrasound are explored. Among these wide gamut of gesture detection techniques, due to the limitations such as dependence on lighting, requirement of specialized hardware etc., the ultrasound based approach looks attractive.

Gesture based HCI has numerous applications on resource constrained edge platforms such as robots, mobile phones etc. In conventional methods, the classification of gestures is achieved via deep neural networks involving convolution (CNN). However, these approaches demand large memory and computation power to run efficiently, thus limiting their use in power and memory constrained edge devices.

SUMMARY

Embodiments of the present disclosure present technological improvements as solutions to one or more of the above-mentioned technical problems recognized by the inventors in conventional systems.

For example, in one aspect, there is provided a processor implemented method for gesture detection using Spiking Neural Networks. The method comprises transmitting, via a plurality of speakers, a plurality of modulated signals to a user; receiving, via a plurality of microphones, a plurality of reflected signals from the user, in response to the plurality of transmitted modulated signals; processing, via a Channel Impulse Response (CIR) estimator, the plurality of transmitted modulated signals and the plurality of reflected signals using a sparsity prior serving as a constraint to obtain a plurality of CIR images; and recognizing, via a Spiking Neural Network (SNN), a gesture performed by the user based on the plurality of CIR images.

In an embodiment, the step of transmitting, via a plurality of speakers, a plurality of modulated signals to a user is preceded by: performing a logical operation on two pseudo random sequences obtained from a generator polynomial, to obtain a plurality of spreading sequence codes; interpolating the plurality of spreading sequence codes to obtain a plurality of interpolated sequences; filtering the plurality of interpolated sequences to obtain a plurality of filtered sequences; appending the plurality of filtered sequences with zeros to obtain a plurality of padded signals; and modulating the plurality of padded signals to obtain the plurality of modulated signals.

In an embodiment, each of the two pseudo random sequences has a length of predefined symbols.

In an embodiment, the steps of filtering the plurality of interpolated sequences, appending the plurality of filtered sequences, and modulating the plurality of padded signals are performed such that each of the plurality of modulated signals obtained for transmission ranges between a first pre-defined acoustic transmission band and a second pre-defined acoustic transmission band.

In an embodiment, the step of receiving, via a plurality of microphones, a plurality of reflected signals from the user, in response to the plurality of transmitted modulated signals comprises: receiving, at the plurality of microphones, a plurality of signals based on the plurality of transmitted modulated signals; applying, at the plurality of microphones, a quadrature demodulation to the plurality of received signals to obtain a plurality of demodulated signals; and filtering, at the plurality of microphones, the plurality of demodulated signals to obtain the plurality of reflected signals.

In an embodiment, the step of processing, via a Channel Image Response (CIR) estimator, the plurality of transmitted modulated signals and the plurality of reflected signals using the sparsity prior serving as the constraint to obtain a plurality of CIR images comprises estimating a plurality of CIR coefficients based on the plurality of transmitted modulated signals, and the plurality of reflected signals using the sparsity prior serving as the constraint; and concatenating the plurality of CIR coefficients to obtain the plurality of CIR images.

In an embodiment, the step of recognizing, via a Spiking Neural Network (SNN), a gesture performed by the user based on the plurality of CIR images comprises converting the plurality of CIR images into a spike domain; extracting, one or more features of the spike-domain using one or more spiking neurons comprised in the SNN; and recognizing the gesture performed by the user from the extracted one or more features by using the SNN.

In an embodiment, the Spiking Neural Network is obtained by training a Convolutional Neural Network (CNN) using training data comprising a plurality of CIR images corresponding to one or more users to obtain a trained CNN; quantizing the trained CNN to obtain a quantized CNN; and converting the quantized CNN to the SNN.

In an embodiment, the quantized CNN is converted to the SNN by performing an approximate matching of a corresponding output of an CNN neuron comprised in the CNN to a firing rate of a spiking neuron comprised in the SNN.

In another aspect, there is provided a processor implemented system for gesture detection using Spiking Neural Networks. The system comprises: a memory storing instructions; one or more communication interfaces; and one or more hardware processors coupled to the memory via the one or more communication interfaces, wherein the one or more hardware processors are configured by the instructions to: transmit, via a plurality of speakers, a plurality of modulated signals to a user; receive, via a plurality of microphones, a plurality of reflected signals from the user, in response to the plurality of transmitted modulated signals; process, via a Channel Impulse Response (CIR) estimator, the plurality of transmitted modulated signals and the plurality of reflected signals using a sparsity prior serving as a constraint to obtain a plurality of CIR images; and recognize, via a Spiking Neural Network (SNN), a gesture performed by the user based on the plurality of CIR images.

In an embodiment, prior to transmitting, via the plurality of speakers, the plurality of modulated signals to the user, the one or more hardware processors are configured by the instructions to perform a logical operation on two pseudo random sequences obtained from a generator polynomial, to obtain a plurality of spreading sequence codes; interpolate the plurality of spreading sequence codes to obtain a plurality of interpolated sequences; filter the plurality of interpolated sequences to obtain a plurality of filtered sequences; append the plurality of filtered sequences with zeros to obtain a plurality of padded signals; and modulate the plurality of padded signals to obtain the plurality of modulated signals.

In an embodiment, each of the two pseudo random sequences has a length of predefined symbols.

In an embodiment, the plurality of interpolated sequences is filtered, the plurality of filtered sequences is appended, and the plurality of padded signals is modulated such that each of the plurality of modulated signals obtained for transmission ranges between a first pre-defined acoustic transmission band and a second pre-defined acoustic transmission band.

In an embodiment, prior to receiving, via the plurality of microphones, the plurality of reflected signals from the user, in response to the plurality of transmitted modulated signals, the one or more hardware processors are configured by the instructions to: receive, at the plurality of microphones, a plurality of signals based on the plurality of transmitted modulated signals; apply, at the plurality of microphones, a quadrature demodulation to the plurality of received signals to obtain a plurality of demodulated signals; and filter, at the plurality of microphones, the plurality of demodulated signals to obtain the plurality of reflected signals.

In an embodiment, the plurality of transmitted modulated signals and the plurality of reflected signals are processed using the sparsity prior serving as the constraint to obtain a plurality of CIR images by estimating a plurality of CIR coefficients based on the plurality of transmitted modulated signals, and the plurality of reflected signals using the sparsity prior serving as the constraint; and concatenating the plurality of CIR coefficients to obtain the plurality of CIR images.

In an embodiment, the gesture performed by the user is recognized based on the plurality of CIR images by converting the plurality of CIR images into a spike domain; extracting, one or more features of the spike-domain using one or more spiking neurons comprised in the SNN; and recognizing the gesture performed by the user from the extracted one or more features by using the SNN.

In an embodiment, the Spiking Neural Network is obtained by training a Convolutional Neural Network (CNN) using training data comprising a plurality of CIR images corresponding to one or more users to obtain a trained CNN; quantizing the trained CNN to obtain a quantized CNN; and converting the quantized CNN to the SNN.

In an embodiment, the quantized CNN is converted to the SNN by performing an approximate matching of a corresponding output of an CNN neuron comprised in the CNN to a firing rate of a spiking neuron comprised in the SNN.

In yet another aspect, there are provided one or more non-transitory machine-readable information storage mediums comprising one or more instructions which when executed by one or more hardware processors cause gesture detection using Spiking Neural Networks by transmitting, via a plurality of speakers, a plurality of modulated signals to a user; receiving, via a plurality of microphones, a plurality of reflected signals from the user, in response to the plurality of transmitted modulated signals; processing, via a Channel Impulse Response (CIR) estimator, the plurality of transmitted modulated signals and the plurality of reflected signals using a sparsity prior serving as a constraint to obtain a plurality of CIR images; and recognizing, via a Spiking Neural Network (SNN), a gesture performed by the user based on the plurality of CIR images.

In an embodiment, the step of transmitting, via a plurality of speakers, a plurality of modulated signals to a user is preceded by: performing a logical operation on two pseudo random sequences obtained from a generator polynomial, to obtain a plurality of spreading sequence codes; interpolating the plurality of spreading sequence codes to obtain a plurality of interpolated sequences; filtering the plurality of interpolated sequences to obtain a plurality of filtered sequences; appending the plurality of filtered sequences with zeros to obtain a plurality of padded signals; and modulating the plurality of padded signals to obtain the plurality of modulated signals.

In an embodiment, each of the two pseudo random sequences has a length of predefined symbols.

In an embodiment, the steps of filtering the plurality of interpolated sequences, appending the plurality of filtered sequences, and modulating the plurality of padded signals are performed such that each of the plurality of modulated signals obtained for transmission ranges between a first pre-defined acoustic transmission band and a second pre-defined acoustic transmission band.

In an embodiment, the step of receiving, via a plurality of microphones, a plurality of reflected signals from the user, in response to the plurality of transmitted modulated signals comprises: receiving, at the plurality of microphones, a plurality of signals based on the plurality of transmitted modulated signals; applying, at the plurality of microphones, a quadrature demodulation to the plurality of received signals to obtain a plurality of demodulated signals; and filtering, at the plurality of microphones, the plurality of demodulated signals to obtain the plurality of reflected signals.

In an embodiment, the step of processing, via a Channel Image Response (CIR) estimator, the plurality of transmitted modulated signals and the plurality of reflected signals using the sparsity prior serving as the constraint to obtain a plurality of CIR images comprises estimating a plurality of CIR coefficients based on the plurality of transmitted modulated signals, and the plurality of reflected signals using the sparsity prior serving as the constraint; and concatenating the plurality of CIR coefficients to obtain the plurality of CIR images.

In an embodiment, the step of recognizing, via a Spiking Neural Network (SNN), a gesture performed by the user based on the plurality of CIR images comprises converting the plurality of CIR images into a spike domain; extracting, one or more features of the spike-domain using one or more spiking neurons comprised in the SNN; and recognizing the gesture performed by the user from the extracted one or more features by using the SNN.

In an embodiment, the Spiking Neural Network is obtained by training a Convolutional Neural Network (CNN) using training data comprising a plurality of CIR images corresponding to one or more users to obtain a trained CNN; quantizing the trained CNN to obtain a quantized CNN; and converting the quantized CNN to the SNN.

In an embodiment, the quantized CNN is converted to the SNN by performing an approximate matching of a corresponding output of an CNN neuron comprised in the CNN to a firing rate of a spiking neuron comprised in the SNN.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 9 depicts a confusion matrix for Gest-SNN dataset (SNN dataset as used by the present disclosure), in accordance with an embodiment of the present disclosure.

DETAILED DESCRIPTION

Figure 1:
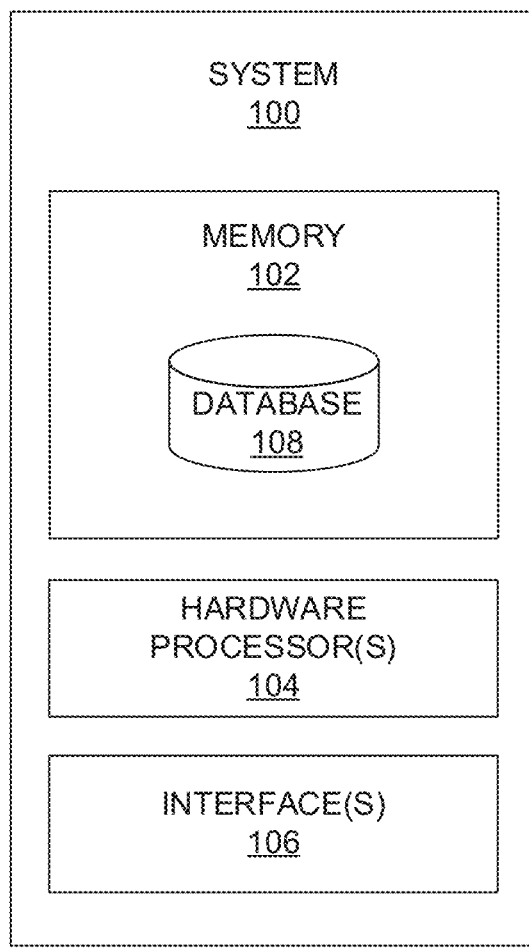
FIG. 1 depicts an exemplary acoustic system for gesture detection using Spiking Neural Networks, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

In recent trends, human computer interaction (HCI) is not just limited to specific hardware such as mouse and keyboard but has broadened to include human sensory modes such as gestures, speech, and facial patterns. Gesture based HCI is one of the most important and attractive technique that has been widely adopted and diverse sensing modalities such as camera, wearable devices, Radio Frequency, and ultrasound are explored. Among these wide gamut of gesture detection techniques, due to the limitations such as dependence on lighting, requirement of specialized hardware etc., the ultrasound based approach looks attractive.

Ultrasound based gesture detection using sound navigation and ranging (SONAR) principle has been extensively explored in literature. The key advantage of this technique is that it uses off-the-shelf available speaker and microphone setup. Gesture detection methods based on ultrasound can broadly be classified under the following categories: i) Fine finger tracking followed by gesture detection, ii) Doppler shift based approach, and iii) Channel impulse response (CIR) image based approach. On the contrary, Yiallourides et al. (e.g., refer "Costas Yiallourides and Pablo Peso Parada, "Low power ultrasonic gesture recognition for mobile handsets," in ICASSP 2019-2019 IEEE International Conference on Acoustics, Speech and Signal Processing (ICASSP). IEEE, 2019, pp. 2697-2701.") described a simple approach which cannot be classified under the aforementioned approaches by using MIMO acoustic setup and making use of simple raw time domain signal features. But as shown in Yiallourides et al. itself, their approach can only detect few gestures and furthermore the accuracy is quite low. Now, as pointed out in literature, while the finger tracking based approaches are not suitable for complex gesture detection (single reflector model), the doppler shift approaches suffer from poor resolution and cannot distinguish minor gestures accurately. On the other hand, the CIR image approach based on least square estimation has shown to perform better compared to other categories. One of the key problems of using the ultrasound based method as discussed in the literature (e.g., refer "Yanwen Wang, Jiaxing Shen, and Yuanqing Zheng, "Push the limit of acoustic gesture recognition," IEEE Transactions on Mobile Computing, 2020."— also referred as Wang et al.) is the ill effect of Frequency Selective Fading (FSF) due to multiple reflections emanating from complex gestures. Wang et al. proposed to overcome this FSF problem by using the frequency hopping technique but this leads to reduced available bandwidth at any given instant due to which the CIR estimation may suffer.

Gesture based HCI has numerous applications on resource constrained edge platforms such as robots, mobile phones etc. In most of the aforementioned methods, the classification of gestures is achieved via deep neural networks involving convolution (CNN). However, these approaches demand large memory and computation power to run efficiently, thus limiting their use in power and memory constrained edge devices. Lately, mammalian brain inspired spiking neural networks (SNN) which runs on neuromorphic platforms that are both data and energy efficient are extensively being considered for edge use cases.

In the present disclosure, method described herein implement an ultrasound based robust low power edge compatible gesture detection system which uses MIMO like setup in the acoustic range of 16 kHz-20 kHz (e.g., depending on the hardware support and specifications) and leverages the diversity to efficiently alleviate the problem of FSF. It is observed through experiments conducted the CIR image for various gestures are sparse in nature and hence the system of the present disclosure estimates CIR by imposing the $l_1$-norm penalty as it is well known to promote sparse solutions. The popular iterative shrinkage threshold algorithm (ISTA) is used for estimating this sparse CIR; however, in the implementation the unfolded variant of ISTA, Learned ISTA (LISTA as known in the art) (after suitable training) is employed for efficient deployment. Due to the advantages of SNNs as mentioned above, SNNs are used by the system and method of the present disclosure for gesture classification from these CIR images. Because of the discontinuous nature of voltage spikes in an SNN, supervised training using established techniques are difficult. An easier way is to convert a trained ANN into an SNN via ANN-to-SNN conversion techniques which retains similar classification accuracy while gaining on energy consumption. Here, the present disclosure and its system and method designed and trained a 5-layer CNN for gesture classification and then converted it into an equivalent SNN. The performance benefit of SNN of the system of the present disclosure is compared against conventional approach (e.g., Ultragesture—(this being better performing than most other competing techniques)). The results indicate that the CIR image obtained with sparsity prior looks much better compared to the least squares approach used in literature. In addition, the classification performance of the converted SNN shows an improvement of around 8% compared to the state-of-the-art Ultragesture. Moreover, converted SNN is found to have 3× less number of operations than its CNN counterpart making the former more energy efficient. This makes the system described herein a robust edge deployable system.

Referring now to the drawings, and more particularly to FIGS. 1 through 9, where similar reference characters denote corresponding features consistently throughout the figures, there are shown preferred embodiments and these embodiments are described in the context of the following exemplary system and/or method.

FIG. 1 depicts an exemplary acoustic system 100 for gesture detection using Spiking Neural Networks, in accordance with an embodiment of the present disclosure. In an embodiment, the system 100 may also be referred as acoustic system or gesture detection system or gesture recognition system and interchangeably used herein. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices (e.g., smartphones, tablet phones, mobile communication devices, and the like), workstations, mainframe computers, servers, a network cloud, and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information on transmitted signal, reflecting (or reflected) signal, sparsity prior serving as a constraint, etc. The database 108 further comprises a plurality of CIR images, gesture being recognized, and the like. The memory 102 further comprises various technique(s) such as Channel Impulse Response (CIR) estimator, logical operations, interpolation technique(s), filtering/up-sampling technique(s), padding technique(s), modulation technique(s), various band pass filter(s), processing technique(s) that include quadrature demodulation technique(s), and the like. Further, the memory 102 further comprises gesture recognition technique(s), quantization technique(e) and the like. Furthermore, the memory 102 comprises a Convolution Neural Network (CNN), a trained spike neural network (or a Spike Neural Network (SNN) being trained, and the like. The above-mentioned technique(s) are implemented as at least one of a logically self-contained part of a software program, a self-contained hardware component, and/or, a self-contained hardware component with a logically self-contained part of a software program embedded into each of the hardware component (e.g., hardware processor 104 or memory 102) that when executed perform the method described herein. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
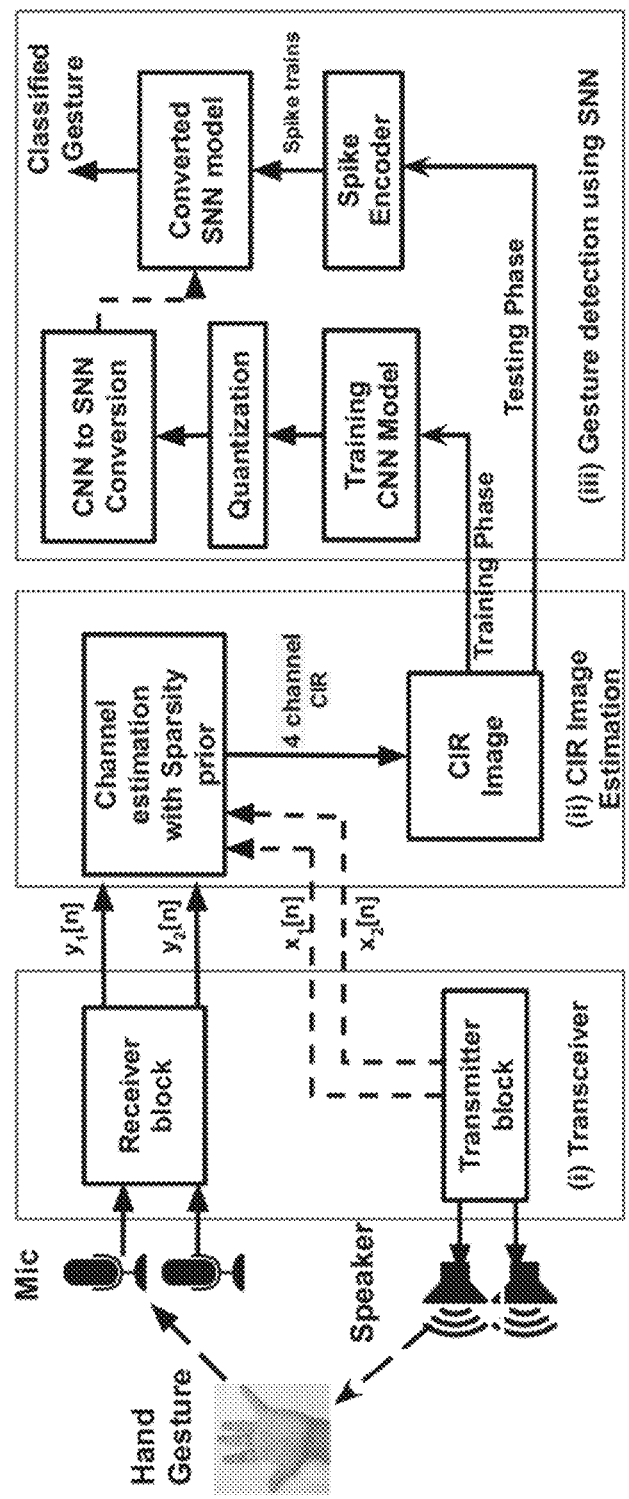
FIG. 2 depicts an exemplary high level block diagram of the acoustic system for gesture detection using Spiking Neural Networks, in accordance with an embodiment of the present disclosure, in accordance with an embodiment of the present disclosure.

FIG. 2, with reference to FIG. 1, depicts an exemplary high level block diagram of the acoustic system 100 for gesture detection using Spiking Neural Networks, in accordance with an embodiment of the present disclosure, in accordance with an embodiment of the present disclosure. More specifically, the system 100 in FIG. 2 includes a transceiver block comprising a transmitter block and a receiver block, a CIR image estimation block, a Spiking Neural Network block for gesture detection. Speakers comprised in the transceiver block transmit distinct waveforms in the 16 kHz-20 kHz band and the microphones receive the reflected signals from the user. Using these reflected signals and the transmitted waveforms, m*n CIR images (e.g., 4 CIR images, wherein m*n=4 and 4 indicates the number of channels, for instance, 2 speakers (e.g., say 'm') and 2 microphones (e.g., say 'n') as used in the present disclosure setup) are generated by imposing the $l_1$-norm constraint. During the training phase, the 5-layer CNN is trained natively using backpropagation on m*n CIR images (e.g., 4 CIR images). The trained network weights are then quantized in order to reduce their memory footprint. Finally, the quantized CNN is converted into equivalent SNN via ANN-to-SNN conversion. During testing phase, m*n CIR images are encoded into spike domain before being fed to the SNN for final classification wherein gesture detection is performed. The description of each block/component depicted in FIG. 2 is better understood by way of examples and in conjunction with FIG. 3 and/or steps of FIG. 4.

Figure 3:
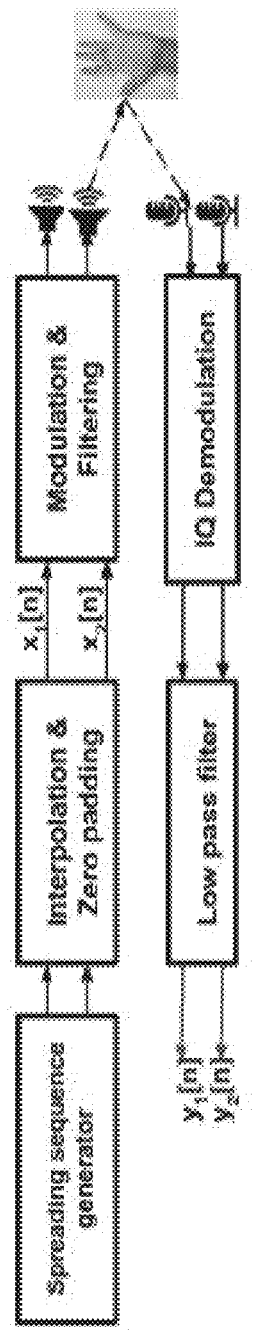
FIG. 3 depicts an exemplary high level block diagram of transmitter and receiver components of the acoustic system of FIGS. 1-2 for gesture detection using Spiking Neural Networks, in accordance with an embodiment of the present disclosure.

FIG. 3, with reference to FIGS. 1-2, depicts an exemplary high level block diagram of transmitter and receiver components of the acoustic system for gesture detection using Spiking Neural Networks, in accordance with an embodiment of the present disclosure.

Figure 4:
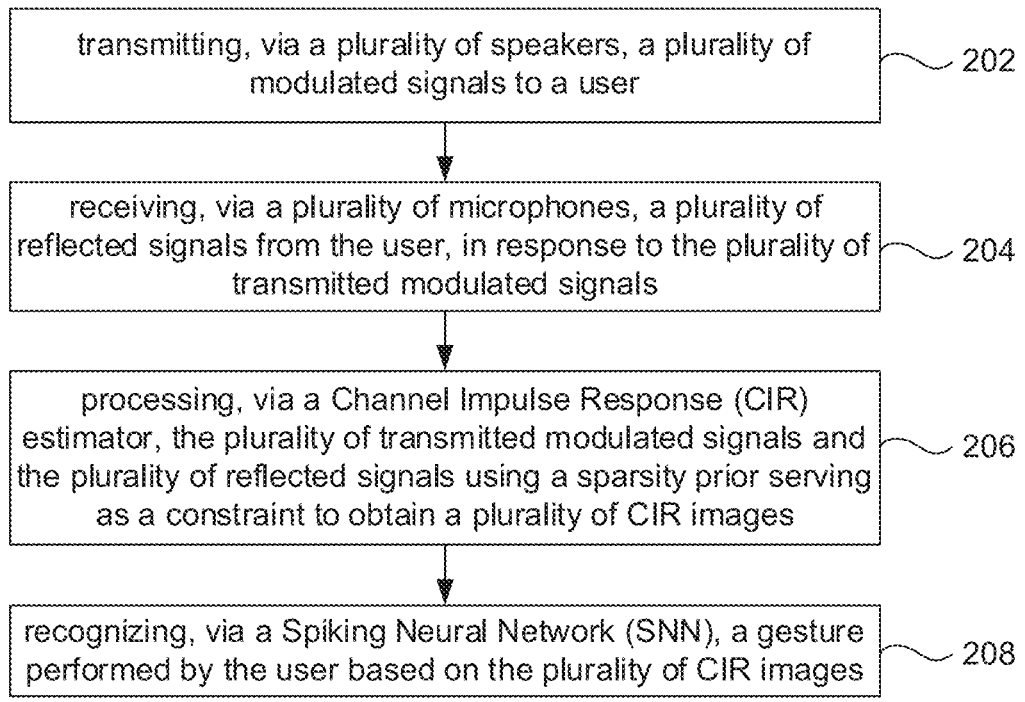
FIG. 4 depicts an exemplary flow chart illustrating an acoustic method for gesture detection using Spiking Neural Networks comprised in the systems of FIG. 1-2, in accordance with an embodiment of the present disclosure.

FIG. 4, with reference to FIGS. 1-3, depicts an exemplary flow chart illustrating an acoustic method for gesture detection using Spiking Neural Networks comprised in the systems of FIG. 1-2, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, the block diagram of the system 100 depicted in FIG. 2 and its components depicted in FIG. 3, and the flow diagram as depicted in FIG. 4.

In an embodiment of the present disclosure, at step 202, the one or more hardware processors 104 transmit, via a plurality of speakers (e.g., speakers depicted in FIGS. 2 and 3), a plurality of modulated signals to a user. Prior to transmitting, via the plurality of speakers, the plurality of modulated signals to the user, the system 100 performs a logical operation on two pseudo random sequences obtained from a generator polynomial, to obtain a plurality of spreading sequence codes. More specifically, an XOR operation is performed on the two pseudo random sequences to obtain a plurality of spreading sequence codes. It is to be understood by a person having ordinary skill in the art or person skilled in the art that such XOR operation shall not be construed as limiting the scope of the present disclosure. In other words, any operation other than XOR operation may also be performed on the two pseudo random sequences to obtain the plurality of spreading sequence codes wherein each of the two pseudo random sequences has a length of predefined symbols. Further, the plurality of spreading sequence codes is interpolated using the interpolating technique comprised in the memory 102 to obtain a plurality of interpolated sequences. The plurality of interpolated sequences is then filtered using a filtering technique to obtain a plurality of filtered sequences. The filtering technique applied herein by the system 100 is a low pass filtering technique, in an example embodiment of the present disclosure. Further, the plurality of filtered sequences is appended with zeros to obtain a plurality of padded signals wherein the system 100 applies a padding technique on the plurality of filtered sequences to append zeros to the plurality of filtered sequences. Further, the plurality of padded signals is modulated using a modulation technique to obtain the plurality of modulated signals. the steps of filtering the plurality of interpolated sequences, appending the plurality of filtered sequences, and modulating the plurality of padded signals are performed such that each of the plurality of modulated signals obtained for transmission ranges between a first pre-defined acoustic transmission band and a second pre-defined acoustic transmission band.

Referring to steps of FIG. 4, at step 204 of the present disclosure, the one or more hardware processors 104 receive, via a plurality of microphones, a plurality of reflected signals from the user, in response to the plurality of transmitted modulated signals. In an embodiment, the expressions "transmitted modulated signals" "transmitted signals" and "modulated signals", may be interchangeably used herein. In an embodiment, the step of receiving, via a plurality of microphones, a plurality of reflected signals from the user, in response to the plurality of transmitted modulated signals comprises: receiving, at the plurality of microphones, a plurality of signals based on the plurality of transmitted modulated signals; applying, at the plurality of microphones, a quadrature demodulation to the plurality of received signals to obtain a plurality of demodulated signals; and filtering, at the plurality of microphones, the plurality of demodulated signals to obtain the plurality of reflected signals.

The above steps of transmitting, via the plurality of speakers, the plurality of modulated signals to the user and receiving, via a plurality of microphones, a plurality of reflected signals from the user, in response to the plurality of transmitted modulated signals are better understood by way of depiction in FIG. 3. The above steps may be further better understood by way of following description:

As shown in FIGS. 2 and 3, the transceiver consists of a plurality of speakers and microphones that mimics a multiple-input multiple-output (MIMO) acoustic transmitter and receiver setup (e.g., m*n MIMO) respectively. The speakers send periodic frames which then gets reflected by the moving hand/finger and these reflected signals are received by the microphones. In the present disclosure, 2*2 MIMO setup is implemented by the system and method described herein. Such MIMO setup shall not be construed as limiting the scope of the present disclosure. In other words, there can be as many number of speakers and as many number of microphones implemented in the system 100 of FIGS as shown. It is to be further understood that based on the number of speakers and microphones implemented, m*n CIR images (or CIR coefficients) are estimated. In the present disclosure's transceiver design, to help in better estimation of the CIR, the system 100 transmit different sequences of same length having small cross correlation from the speakers. While one can use the well-known spreading sequences that are widely used in multi-user CDMA communication, here in the method of the present disclosure, the system employs Gold codes (e.g., refer "Moss Ali Abu-Rgheff, Introduction to CDMA wireless communications, Academic Press, 2007") which exhibit good correlation properties. This helps in reducing the interference and thus aids in better estimation of the channel. In the transceiver of the system 100, Gold codes are used that are generated by performing XOR operation on two pseudo random sequences having a length of 31 symbols (e.g., also referred as a length of predefined symbols and interchangeably used herein). The generator polynomials for the two sequences are $z^5+z^4+z^3+z^2+1$ and $z^5+z^2+1$ respectively. Let $c_i(n)$, $i=\{1, 2\}$ denote the two different sequences of length 31, which are interpolated by 'p' times (e.g., p=10 times in the present disclosure and such number of interpolations shall not be construed as limiting the scope of the present disclosure), followed by low pass filtering of 'k' kHz (e.g., k=4 kHz and such frequency application for filtering shall not be construed as limiting the scope of the present disclosure). Further to reduce the effect of inter frame interference, the sequence is appended with zeros such that the total length of each frame is of duration 'y' ms (e.g., 10 ms comprising 480 samples—such padding application with zeros shall not be construed as limiting the scope of the present disclosure). Let this filtered, up sampled/interpolated, and zero padded signal be denoted by $x_i(n)$, which is then modulated by a carrier of $f_c$=q kHz (e.g., q=18 kHz and such modulating application with 18 kHz shall not be construed as limiting the scope of the present disclosure) by multiplying it with $\sqrt{2}\cos 2\pi f_c t$. The above upsampling, filtering and modulating operations are performed to restrict the acoustic transmission band between 16 kHz (e.g., the first pre-defined acoustic transmission band) to 20 kHz (e.g., the second first pre-defined acoustic transmission band). This acoustic band is chosen because it is almost inaudible to human ears and further, most commercially available speakers and microphones show good frequency response in this band. Each frame comprising of these 480 samples is looped back and played through the speakers at a sampling rate of 'r' kHz (e.g., r=48 kHz and such sampling rate of 48 kHz shall not be construed as limiting the scope of the present disclosure. These transmitted modulated signals get reflected from the hand and the reflected signals are captured by the microphones. As a first step, at each microphone as shown in FIG. 3, the system 100 applies the quadrature demodulation by multiplying it with the signal $\{\sqrt{2}\cos 2\pi f_c t, -\sqrt{2}\sin 2\pi f_c t\}$. The demodulated signal(s) is/are then filtered with a 4 kHz low pass filter to obtain the complex baseband signals, $y_j(n)$, j=1, 2, which are received at the two microphones (e.g., also referred the plurality of reflected signals and interchangeably used herein). The transmitted and the received sequence $x_i(n)$ and $y_j(n)$, i,j=1, 2 respectively (also referred as the plurality of modulated signals/the plurality of transmitted modulated signals and the plurality of reflected signals are used for CIR estimation.

In this regard, at step 206 of the present disclosure, the one or more hardware processors 104 process, via a Channel Impulse Response (CIR) estimator, the plurality of transmitted modulated signals and the plurality of reflected signals to obtain a plurality of CIR images. The plurality of transmitted modulated signals and the plurality of reflected signals are processed by the CIR estimator (or also referred as CIR estimation block) wherein a plurality of CIR coefficients are estimated based on the plurality of transmitted modulated signals, and the plurality of reflected signals using a sparsity prior serving as a constraint and the plurality of CIR coefficients are concatenated to obtain the plurality of CIR images. The above step of processing the plurality of transmitted modulated signals and the plurality of reflected signals via the CIR estimator to obtain the plurality of CIR images is better understood by way of following description:

The reflected signal(s) from the hand comprise of multiple reflections from different points depending upon the gesture and thus can aptly be modeled by a multipath channel. This multipath channel is characterized by an L tap finite impulse response filter. The received signal at the jth microphone, $y_j(n)$ can be expressed as:

$$y_j(n) = \Sigma_{i=1}^{2} \Sigma_{l=0}^{L-1} h_{ij}(l) x_i(n-l) + \eta_j(n) \quad (1)$$

where $\{h_{ij}(l)\}_{l=0}^{L-1}$ denotes the L tap CIR of the reflected signal(s) from ith speaker to the jth microphone and $\eta_j(n)$ denotes the additive white Gaussian noise. Addition of or introduction to white Gaussian noise is optional. In the present disclosure, the system 100 considered the total number of channel taps L to be 140 which approximately translates to 1m. The above equation can be represented in the following matrix as:

$$y_j = \underbrace{(X_1 \ X_2)}_{x} \underbrace{\begin{pmatrix} h_{1j} \\ h_{2j} \end{pmatrix}}_{h_j} + \eta_j \quad (2)$$

where for any i,j=1, 2, $h_{1j}$, $h_{2j}$ herein referred as $h_j$, the received signal(s) $y_j=[y_j(0), y_j(1), y_j(P-1)]^T$ and $X_i$ is a matrix of dimension P×L which can be expressed as:

$$X_i = \begin{pmatrix} x_i(0) & x_1(-1) & \dots & x_i(-L+1) \\ x_i(1) & x_i(0) & \dots & x_i(-L+2) \\ \vdots & \vdots & \ddots & \vdots \\ x_i(P-1) & x_i(P-2) & \dots & x_i(P-L) \end{pmatrix} \quad (3)$$

The value of P is chosen such that P+L=480 which corresponds to the length of each transmitted frame. $h_j$ denotes the CIR at a particular time index. In other words, $h_j$ is the CIR coefficient (also referred as coefficient and interchangeably used herein) being estimated at a particular time index. To estimate CIR using equation (2), a simple least square similar can be employed. But it is now important to observe from FIG. 5, which provides a CIR illustration corresponding to few gestures, that the CIR at any given particular time index is sparse in nature. More specifically, FIG. 5, with reference to FIGS. 1 through 4, depicts 4 CIR images corresponding to two complimentary (a) anticlockwise and (b) clockwise finger rotation respectively, in accordance with an embodiment of the present disclosure. In other words, only few taps in $h_j$ tend to be significant, while most of them can be neglected. Hence, in the present disclosure, the system 100 estimates the CIR images by solving the following optimization:

$$h_j = \underset{h_j}{\operatorname{argmin}} \|y_j - Xh_j\|_2^2 + \lambda\|h_j\|_1 \quad (4)$$

Figure 5:
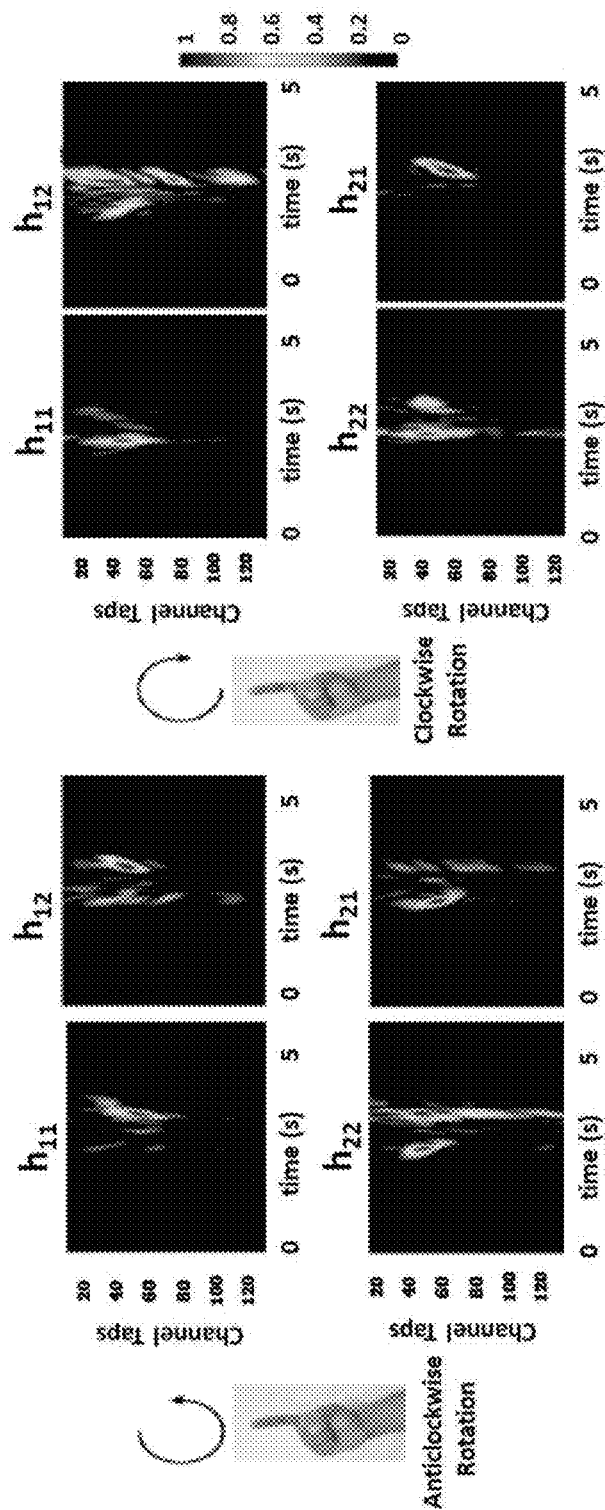
FIG. 5 depicts m*n CIR images (e.g., 4 CIR images) corresponding to two complimentary (a) anticlockwise and (b) clockwise finger rotation respectively, in accordance with an embodiment of the present disclosure.
Figure 6:
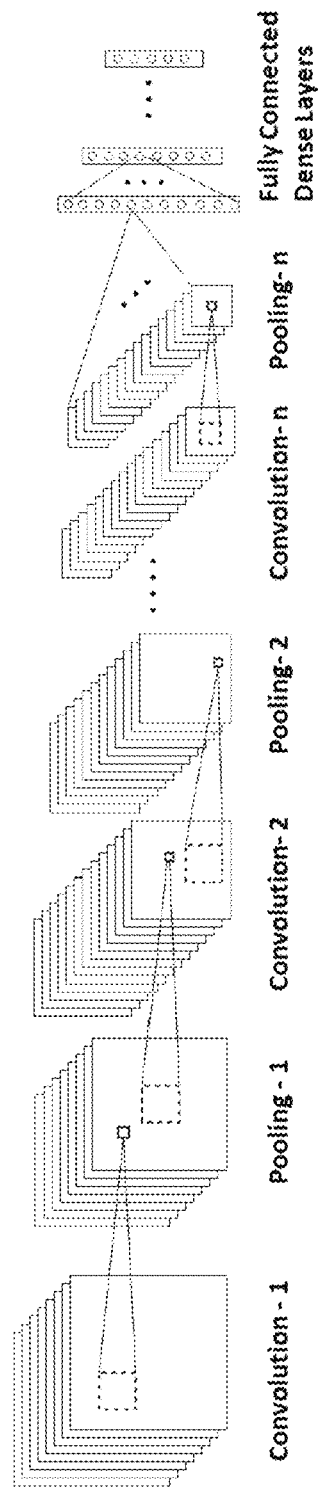
FIG. 6 depicts an exemplary 5-Layer Convolutional Neural Network (CNN) architecture for gesture classification with 4-channel CIR images, in accordance with an embodiment of the present disclosure.

The regularizer $\|h_j\|_1$ is introduced since it is well known that $l_1$-norm promotes sparse solution, wherein the sparse solution is also referred as sparsity prior serving as the constraint, and $\lambda$ is a hyper-parameter which controls between mean square error (MSR) and the sparsity prior serving as the constraint. The above equation can be solved by using iterative shrinkage threshold algorithm (ISTA) (e.g., refer "Giuseppe C Calafiore and Laurent El Ghaoui, Optimization models, Cambridge university press, 2014.") whose (k+1)th iterative update is given as:

$$h_j^{(k+1)} = \operatorname{soft}\left(h_j^{(k)} + \frac{1}{\alpha} X^T(y_j - Xh_j^{(k)}), \frac{\lambda}{2\alpha}\right) \quad (5)$$

where for any y, γ, soft(y, γ)=sign(y)max (0, |y|−γ) and α is the learning rate. On implementation, the system 100 observed that for most instances, the above solution was converging with less than 5 iterations. However, for efficient implementation, the system 100 has used the unfolded variant of ISTA, LISTA (learned iterative shrinkage threshold algorithm) comprising 3 layers with appropriate training. $\{h_j\}_{j=1}^{2}$ is found using corresponding $\{y_j\}_{j=1}^{2}$, from which the four CIRs $\{h_{ij}(l)\}_{l=0}^{L-1}$, i,j=1, 2 can easily be separated. This CIR estimation is repeated for every 10 ms i.e., corresponding to the length of each transmitted frame. By concatenating the CIR (or CIR coefficients) at every time index and considering only the magnitude, the CIR images are obtained as shown in FIG. 5. Since the system 100 employs a 2*2 MIMO like setup, it is highly unlikely that all channels (e.g., 4 channels) would be in deep fade, hence making it robust against the ill effects of FSF. Further, is it noticed from FIG. 5 that the distinctive 4 CIR images correspond to two complimentary clockwise and anticlockwise finger rotations. These distinctive images shall be used for gesture detection. In other words, at step 208 of the present disclosure, the one or more hardware processors 104 recognize, via a Spiking Neural Network (SNN), a gesture performed by the user based on the plurality of CIR images. In an embodiment, the step of recognizing, via the Spiking Neural Network (SNN), the gesture performed by the user based on the plurality of CIR images comprises converting the plurality of CIR images into a spike domain; extracting, one or more features of the spike-domain using one or more spiking neurons comprised in the SNN; and recognizing the gesture performed by the user from the extracted one or more features by using the SNN. In an embodiment, the Spiking Neural Network is obtained by training a Convolutional Neural Network (CNN) using training data comprising a plurality of CIR images corresponding to one or more users to obtain a trained CNN; quantizing the trained CNN to obtain a quantized CNN; and converting the quantized CNN to the SNN. The training of CNN and obtaining SNN are better understood by way of following description:

A 5-layered convolutional architecture comprising of three convolution layers and two fully connected layers, as shown in FIG. 6, is designed to train on four-CIR images (also referred as 4-channel CIR images and interchangeably used herein). More specifically, FIG. 6, with reference to FIGS. 1 through 5, depicts an exemplary 5-Layer Convolutional Neural Network (CNN) architecture for gesture classification with 4 CIR images, in accordance with an embodiment of the present disclosure. Each convolution layer learns a set of filters of sizes 7×7, 5×5, and 3×3 that are capable of extracting features from a 2D-receptive field (e.g., inner rectangular/square window) of their respective inputs. After each convolution layer, a max-pooling layer with kernel 4×4 is introduced that imparts some degree of generalization and translation invariance to the extracted features. Moreover, it helps down sampling the input space. Of the next two dense fully connected layers, the last one is the final classification output layer giving the gesture probabilities. Both dense layers learn the mapping between the spatial features and gesture probabilities. ReLu activation is used for both convolution and dense layers except for the final output layer which uses a SoftMax function. Dropout is used for regularizing the network with a drop-off probability of 0.3. Categorical cross entropy loss is employed to guide the gradient descent for estimation of optimal network weights as shown in the following equation (6), where $c_n$ denotes the actual probability of $n^{th}$ gesture class occurrence and $\hat{c}_n$ is the SoftMax output from the output layer of CNN.

$$\mathcal{L} = -\frac{1}{N}\sum_{n=1}^{N} c_n \log \hat{c}_n \qquad (6)$$

Next, Quantization is performed on the trained CNN in order to reduce its memory footprint and improve its latency. The system 100 applies weight and activation quantization from single-precision floating point (32-bits) to byte sized unsigned integers (8-bits). This is done using binning the 32-bit floating point range into 255 unique values. Quantization Aware Training (QAT) which is the optimal way to estimate these bin values from training data, is used here. It is to be understood by a person having ordinary skill in the art or person skilled in the art that such use of 5-layer CNN shall not be construed as limiting the scope of the present disclosure.

Finally, the quantized CNN is converted into an equivalent SNN. This is done by approximately matching the output of an ANN neuron to the firing rate of a spiking neuron. Here, a corresponding SNN network is constructed using Integrate-and-Fire (IF) neuron model as shown in the following equation (7).

$$I_l(t) = V_l(t-1) + W_l^T s_l(t-1) + b_l$$

$$V_l = I_l(t)(u - s_l(t))$$

$$s_l(t) = \mathcal{H}(I_l(t) - V_{th}) \qquad (7)$$

$V_l(t)$ represents the membrane potential vector of the spiking neurons at time t in layer l, $I_l(t)$ represents the residual potential vector at time t and $s_l(t)$ represents the spiking activity of the neurons where $V_{th}$ is the threshold potential of the spiking neurons. $\mathcal{H}$ is the Heavyside Step function, $b_l$ gives the bias term for the neurons of layer l and u is a vector comprising of all ones. The membrane potential of the IF neuron models is modified as shown in equation (8) below to reduce the error in the approximation of ReLU activation with firing rate.

$$V_l(t) = I_l(t) - v_{th} s_l(t) \qquad (8)$$

Weights for each layer are normalized with 99th-percentile value of ReLU activations of that layer as shown in equation (9) below, where $\lambda_l$ represents the 99th-percentile value of ReLU activations in l-th layer during training.

$$W_l^{SNN} = W_l^{SNN} \frac{\lambda_{l-1}}{\lambda_l}, \, b_l^{SNN} = \frac{b_l^{SNN}}{\lambda_l} \qquad (9)$$

Softmax function is applied to the membrane potentials of the final output layer in the converted SNN, and the resultant values are treated as the probability of occurrence of corresponding gesture class. Max pooling layers are implemented in the converted SNN by means of a Hard Winner-Take-All mechanism (among neurons in the pooling window) where the neuron which spikes first, inhibits all the other neuron in its window from activating. For Max pooling, instead of directly solving maximum activity problem in spike domain, the system 100 approximates maximum spiking neuron with first spiking neuron. In the testing phase, to test the performance of the converted multi-layer SNN, the four CIR images in the real-valued space need to be encoded into spike domain before being fed to the SNN. The system and method of the present disclosure used a rate-based Poisson encoding scheme which treats the real-value as the rate of a Poisson process. Thus, for each CIR channel pixel value, an independent spike train containing the information in the form of firing rate is obtained. These spike trains can be directly fed to the input layer of the converted SNN to obtain predicted gesture probabilities.

Experimental Results

Figure 7:
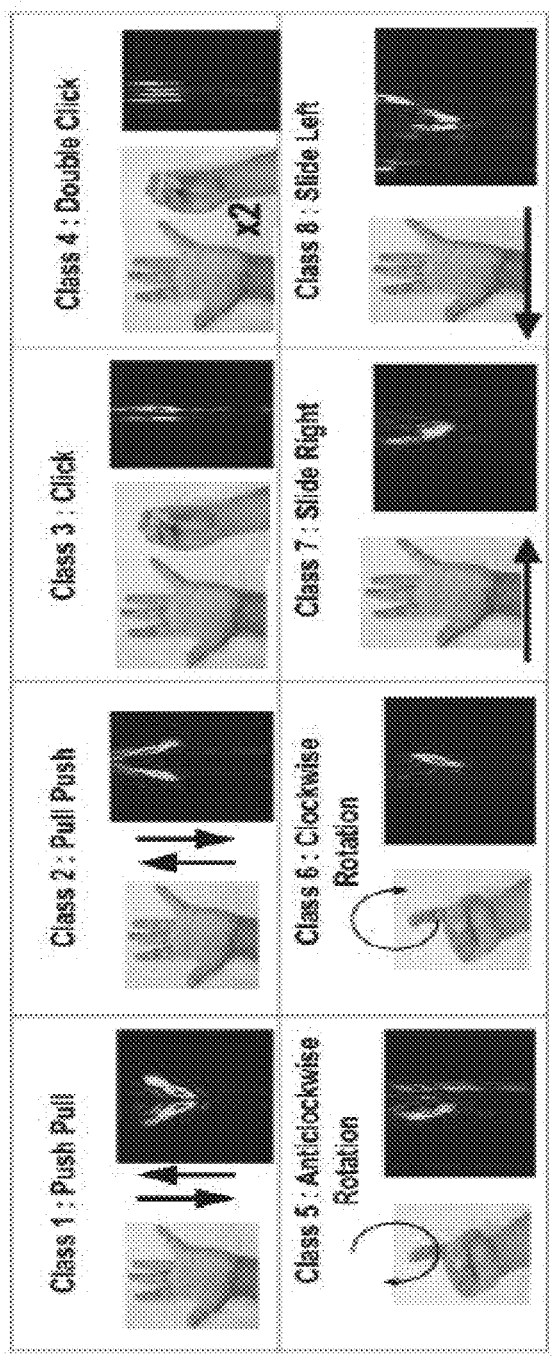
FIG. 7 depicts a plurality of gestures (e.g., 8 gestures) considered along with a corresponding CIR image, in accordance with an embodiment of the present disclosure.

The system and method of the present disclosure have collected data for 8 gestures from 5 different subjects using the inbuilt speakers and microphones of DELL® Precision laptop. The gestures considered for experiments by the system 100 are taken from Ling et al. (e.g., refer "Kang Ling, Haipeng Dai, Yuntang Liu, and Alex X. Liu, "Ultragesture: Fine-grained gesture sensing and recognition," in 2018 15th Annual IEEE International Conference on Sensing, Communication, and Networking (SECON), 2018, pp. 1-9.") and is shown in FIG. 7. More specifically, FIG. 7, with reference to FIGS. 1 through 6, depicts a plurality of gestures (e.g., 8 gestures) considered along with a corresponding CIR image, in accordance with an embodiment of the present disclosure. Each subject performs individual gesture 100 times. For the purpose of comparison, the system 100 chose technique from Ling et al. because it has been shown in Zhengjie Wang. et. al (e.g., refer "Hand gesture recognition based on active ultrasonic sensing of smartphone: A survey," IEEE Access, vol. 7, pp. 111897-111922, 2019.) that Ling et al. performed better than most other competing methods. Hence, from the recorded reflections, CIR images of each gesture are estimated by the system 100 for the following two cases: i) Dataset of the present disclosure: Four CIR images, using 3-layer LISTA, ii) Ultragesture dataset: two CIR images using LS (Least Square) approach to mimic the setup of Ling et al. (one speaker and two microphones). Further, FIG. 7 also shows the distinctive one channel CIR image (h22) corresponding to different gestures.

Figure 8:
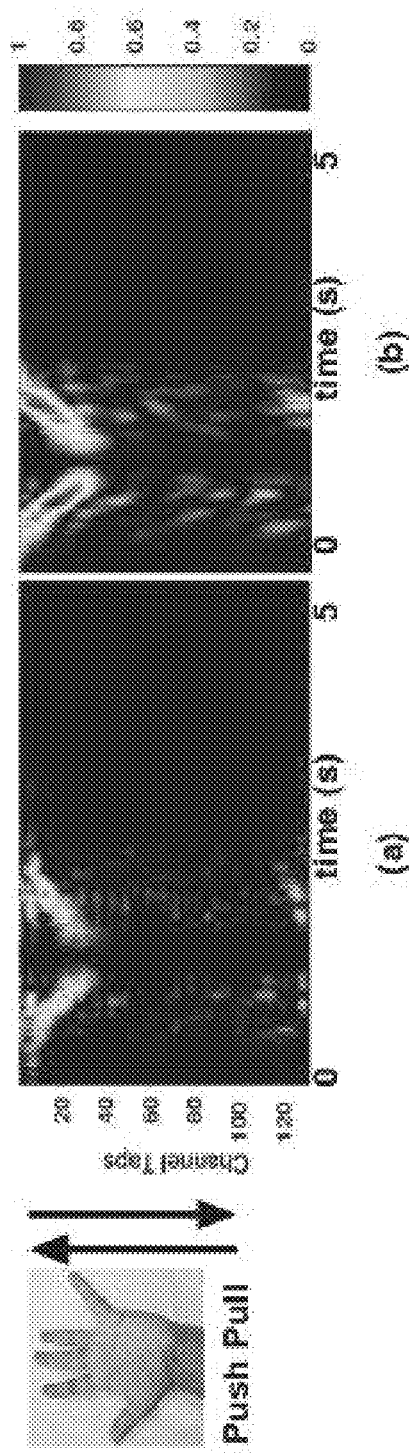
FIG. 8 depicts CIR images obtained (a) using the UltraGesture (conventional approach), and (b) with the SNN as implemented by the system 100 of FIGS. 1-2 for a push-pull gesture, in accordance with an embodiment of the present disclosure.

First, the system and method of the present disclosure provide a comparison between the quality of CIR images estimated with the proposed sparsity prior based approach and the LS based approach that are used in state-of-the-art methods (e.g., refer "Kang Ling, Haipeng Dai, Yuntang Liu, and Alex X. Liu, "Ultragesture: Fine-grained gesture sensing and recognition," in 2018 15th Annual IEEE International Conference on Sensing, Communication, and Networking (SECON), 2018, pp. 1-9"). For the sake of illustration, FIG. 8 shows only one channel CIR image estimated using both the aforementioned approaches. It is noticed/observed from FIG. 8 that the least square based approach provides a degraded CIR image compared to the LISTA based approach of the present disclosure, which thus aids in better gesture detection. More specifically, FIG. 8, with reference to FIGS. 1 through 7, depicts CIR images obtained (a) using the UltraGesture (conventional approach), and (b) with the SNN as implemented by the system 100 of FIGS. 1-2 for a push-pull gesture, in accordance with an embodiment of the present disclosure. Next, results for gesture detection are provided herein by the system and method of the present disclosure. For each gesture, for both the above-mentioned datasets, the ratio of training and test data is 4:1. The CNN network has been created on Python 3.7 using TensorFlow v2.4.1 and has been tested on an 8 GB Nvidia Turing Architecture GPU. ANN-to-SNN conversion and the simulated run of SNN was also done on the same system using TensorFlow.

Classification Results:

The system 100 and the method of the present disclosure have tested the classification performance using (i) the trained CNN, (ii) the Quantized CNN and (iii) the converted SNN. As shown in Table 1, the mean testing accuracy for SNN as implemented by the system 100 with these three networks are 93.2%, 93.5% and 94% respectively. Each of these accuracy values is higher than corresponding accuracy values obtained for Ultragesture dataset, thanks to better CIR estimation and the robustness to ill effects of fading due to MIMO like setup in SNN as implemented by the system 100 and the method of the present disclosure.

TABLE 1

| Dataset | Accuracy in % | | |
|---|---|---|---|
| | CNN | Quantized CNN | SNN |
| SNN dataset of the present disclosure | 93.2 | 93.5 | 94.0 |
| Ultra-gesture | 85.7 | 85.6 | 85.3 |

The active power consumption of a neuromorphic hardware is mainly contributed by the spiking network's total number of synaptic operations (SOP). Following (7) and the method mentioned in Sorbaro et al. (e.g., refer "Martino Sorbaro, Qian Liu, Massimo Bortone, and Sadique Sheik, "Optimizing the energy consumption of spiking neural networks for neuromorphic applications," Frontiers in Neuroscience, vol. 14, pp. 662, 2020."), total number of synaptic operation for the SNN of the system 100 is found to be ~35M while that for the CNN is ~95M (considering matrix multiplication only). This converted SNN can be implemented on neuromorphic platforms such as Brainchip Akida (e.g., refer "Brainchip unveils the akidatm development environment," https://www.brainchipinc.com/news-media/pressreleases/detail/61/brainchip-unveils-the-akida-developmentenvironment, 2019"), Intel® Loihi (e.g., refer "Mike Davies. et. al, "Advancing neuromorphic computing with loihi: A survey of results and outlook," Proceedings of the IEEE, vol. 109, no. 5, pp. 911-934, 2021."), etc. to achieve further power benefit (~100×). FIG. 9 shows the confusion matrix for converted SNN for 8 gesture classes. More specifically, FIG. 9, with reference to FIGS. 1 through 8, depicts a confusion matrix for Gest-SNN dataset (SNN dataset as used by the present disclosure), in accordance with an embodiment of the present disclosure. Though most of the classes are correctly classified, Click and Double Click being single point gestures, are sometimes confused by the network. Also, the mean value of the class wise Average Precision (AP) is found to be 0.9425 and mean of Average Recall (AR) is found to be 0.9400 for the SNN of the system 100.

The system and method of the present disclosure implemented an ultrasound based system or acoustic system which uses CIR image and SNN for gesture classification providing an improvement of 8% over existing state-of-the-art. The system leverages the MIMO diversity by using a plurality of speakers and microphones and estimates the CIR with the assumption of sparsity. Use of SNN, created via ANN-to-SNN conversion on a trained 5-layer CNN, brings in energy benefit, thanks to lesser number of operations. From these results, it can be concluded that SNN as implemented by the system and method of the present disclosure is a good alternative, frugal and robust gesture detection system compatible for deployment on resource constrained edge platforms.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
   transmitting, via a plurality of speakers, a plurality of modulated signals to a user;
   receiving, via a plurality of microphones, a plurality of reflected signals from the user, in response to the plurality of transmitted modulated signals;
   processing, via a Channel Impulse Response (CIR) estimator, the plurality of transmitted modulated signals and the plurality of reflected signals using a sparsity prior serving as a constraint to obtain a plurality of CIR images; and
   recognizing, via a Spiking Neural Network (SNN), a gesture performed by the user based on the plurality of CIR images,
   wherein the Spiking Neural Network is obtained by:
   training a Convolutional Neural Network (CNN) using training data comprising a plurality of CIR images corresponding to one or more users to obtain a trained CNN;
   quantizing the trained CNN to obtain a quantized CNN; and
   converting the quantized CNN to the SNN, wherein the quantized CNN is converted to the SNN by performing an approximate matching of a corresponding output of an CNN neuron comprised in the CNN to a firing rate of a spiking neuron comprised in the SNN.

2. The processor implemented method of claim 1, wherein the step of transmitting, via a plurality of speakers, the plurality of modulated signals to the user is preceded by:
   performing a logical operation on two pseudo random sequences obtained from a generator polynomial, to obtain a plurality of spreading sequence codes, wherein each of the two pseudo random sequences has a length of predefined symbols;
   interpolating the plurality of spreading sequence codes to obtain a plurality of interpolated sequences;
   filtering the plurality of interpolated sequences to obtain a plurality of filtered sequences;
   appending the plurality of filtered sequences with zeros to obtain a plurality of padded signals; and
   modulating the plurality of padded signals to obtain the plurality of modulated signals.

3. The processor implemented method of claim 2, wherein the steps of filtering the plurality of interpolated sequences, appending the plurality of filtered sequences, and modulating the plurality of padded signals are performed such that each of the plurality of modulated signals obtained for transmission ranges between a first pre-defined acoustic transmission band and a second pre-defined acoustic transmission band.

4. The processor implemented method of claim 1, wherein the step of receiving, via the plurality of microphones, the plurality of reflected signals from the user, in response to the plurality of transmitted modulated signals comprises:
   receiving, at the plurality of microphones, a plurality of signals based on the plurality of transmitted modulated signals;
   applying, at the plurality of microphones, a quadrature demodulation to the plurality of received signals to obtain a plurality of demodulated signals; and
   filtering, at the plurality of microphones, the plurality of demodulated signals to obtain the plurality of reflected signals.

5. The processor implemented method of claim 1, wherein the step of processing, via the Channel Image Response (CIR) estimator, the plurality of transmitted modulated signals and the plurality of reflected signals using the sparsity prior serving as the constraint to obtain a plurality of CIR images comprises:

estimating a plurality of CIR coefficients based on the plurality of transmitted modulated signals, and the plurality of reflected signals using the sparsity prior serving as the constraint; and concatenating the plurality of CIR coefficients to obtain the plurality of CIR images.

6. The processor implemented method of claim 1, wherein the step of recognizing, via a Spiking Neural Network (SNN), a gesture performed by the user based on the plurality of CIR images comprises:

converting the plurality of CIR images into a spike domain;

extracting, one or more features of the spike-domain using one or more spiking neurons comprised in the SNN; and recognizing the gesture performed by the user from the extracted one or more features by using the SNN.

7. A system, comprising:

a memory storing instructions;

one or more communication interfaces; and one or more hardware processors coupled to the memory via the one or more communication interfaces, wherein the one or more hardware processors are configured by the instructions to:

transmit, via a plurality of speakers, a plurality of modulated signals to a user;

receive, via a plurality of microphones, a plurality of reflected signals from the user, in response to the plurality of transmitted modulated signals;

process, via a Channel Impulse Response (CIR) estimator, the plurality of transmitted modulated signals and the plurality of reflected signals using a sparsity prior serving as a constraint to obtain a plurality of CIR images; and recognize, via a Spiking Neural Network (SNN), a gesture performed by the user based on the plurality of CIR images, wherein the Spiking Neural Network is obtained by:

training a Convolutional Neural Network (CNN) using training data comprising a plurality of CIR images corresponding to one or more users to obtain a trained CNN;

quantizing the trained CNN to obtain a quantized CNN; and converting the quantized CNN to the SNN, wherein the quantized CNN is converted to the SNN by performing an approximate matching of a corresponding output of an CNN neuron comprised in the CNN to a firing rate of a spiking neuron comprised in the SNN.

8. The system of claim 7, wherein prior to transmitting, via the plurality of speakers, the plurality of modulated signals to the user, the one or more hardware processors are configured to:

perform a logical operation on two pseudo random sequences obtained from a generator polynomial, to obtain a plurality of spreading sequence codes, wherein each of the two pseudo random sequences has a length of predefined symbols;

interpolate the plurality of spreading sequence codes to obtain a plurality of interpolated sequences;

filter the plurality of interpolated sequences to obtain a plurality of filtered sequences;

append the plurality of filtered sequences with zeros to obtain a plurality of padded signals; and modulate the plurality of padded signals to obtain the plurality of modulated signals.

9. The system of claim 8, wherein the plurality of interpolated sequences, the plurality of filtered sequences are appended, and the plurality of padded signals are modulated such that each of the plurality of modulated signals obtained for transmission ranges between a first pre-defined acoustic transmission band and a second pre-defined acoustic transmission band.

10. The system of claim 7, wherein the plurality of reflected signals is obtained from the user, in response to the plurality of transmitted modulated signals by:

receiving, at the plurality of microphones, a plurality of signals based on the plurality of transmitted modulated signals;

applying, at the plurality of microphones, a quadrature demodulation to the plurality of received signals to obtain a plurality of demodulated signals; and filtering, at the plurality of microphones, the plurality of demodulated signals to obtain the plurality of reflected signals.

11. The system of claim 7, wherein the plurality of transmitted modulated signals and the plurality of reflected signals are processed via the CIR estimator using the sparsity prior serving as the constraint to obtain the plurality of CIR images by:

estimating a plurality of CIR coefficients based on the plurality of transmitted modulated signals, and the plurality of reflected signals using the sparsity prior serving as the constraint; and concatenating the plurality of CIR coefficients to obtain the plurality of CIR images.

12. The system of claim 7, wherein the gesture performed by the user is recognized based on the plurality of CIR images by:

converting the plurality of CIR images into a spike domain;

extracting, one or more features of the spike-domain using one or more spiking neurons comprised in the SNN; and recognizing the gesture performed by the user from the extracted one or more features by using the SNN.

13. One or more non-transitory machine-readable information storage mediums comprising one or more instructions which when executed by one or more hardware processors cause:

transmitting, via a plurality of speakers, a plurality of modulated signals to a user;

receiving, via a plurality of microphones, a plurality of reflected signals from the user, in response to the plurality of transmitted modulated signals;

processing, via a Channel Impulse Response (CIR) estimator, the plurality of transmitted modulated signals and the plurality of reflected signals using a sparsity prior serving as a constraint to obtain a plurality of CIR images; and recognizing, via a Spiking Neural Network (SNN), a gesture performed by the user based on the plurality of CIR images, wherein the Spiking Neural Network is obtained by:

training a Convolutional Neural Network (CNN) using training data comprising a plurality of CIR images corresponding to one or more users to obtain a trained CNN;

quantizing the trained CNN to obtain a quantized CNN; and converting the quantized CNN to the SNN, wherein the quantized CNN is converted to the SNN by performing an approximate matching of a corresponding output of an CNN neuron comprised in the CNN to a firing rate of a spiking neuron comprised in the SNN.

14. The one or more non-transitory machine-readable information storage mediums of claim 13, wherein the step of transmitting, via a plurality of speakers, the plurality of modulated signals to the user is preceded by:
performing a logical operation on two pseudo random sequences obtained from a generator polynomial, to obtain a plurality of spreading sequence codes, wherein each of the two pseudo random sequences has a length of predefined symbols;
interpolating the plurality of spreading sequence codes to obtain a plurality of interpolated sequences;
filtering the plurality of interpolated sequences to obtain a plurality of filtered sequences;
appending the plurality of filtered sequences with zeros to obtain a plurality of padded signals; and
modulating the plurality of padded signals to obtain the plurality of modulated signals.

15. The one or more non-transitory machine-readable information storage mediums of claim 14, wherein the steps of filtering the plurality of interpolated sequences, appending the plurality of filtered sequences, and modulating the plurality of padded signals are performed such that each of the plurality of modulated signals obtained for transmission ranges between a first pre-defined acoustic transmission band and a second pre-defined acoustic transmission band.

16. The one or more non-transitory machine-readable information storage mediums of claim 13, wherein the step of receiving, via the plurality of microphones, the plurality of reflected signals from the user, in response to the plurality of transmitted modulated signals comprises:
receiving, at the plurality of microphones, a plurality of signals based on the plurality of transmitted modulated signals;
applying, at the plurality of microphones, a quadrature demodulation to the plurality of received signals to obtain a plurality of demodulated signals; and
filtering, at the plurality of microphones, the plurality of demodulated signals to obtain the plurality of reflected signals.

17. The one or more non-transitory machine-readable information storage mediums of claim 13, wherein the step of processing, via the Channel Image Response (CIR) estimator, the plurality of transmitted modulated signals and the plurality of reflected signals using the sparsity prior serving as the constraint to obtain a plurality of CIR images comprises:
estimating a plurality of CIR coefficients based on the plurality of transmitted modulated signals, and the plurality of reflected signals using the sparsity prior serving as the constraint; and
concatenating the plurality of CIR coefficients to obtain the plurality of CIR images.

18. The one or more non-transitory machine-readable information storage mediums of claim 13, wherein the step of recognizing, via a Spiking Neural Network (SNN), a gesture performed by the user based on the plurality of CIR images comprises:
converting the plurality of CIR images into a spike domain;
extracting, one or more features of the spike-domain using one or more spiking neurons comprised in the SNN; and
recognizing the gesture performed by the user from the extracted one or more features by using the SNN.

* * * * *